June 7, 1927.

E. H. AMET 1,631,570

MOTION PICTURE FILM FEED

Filed Sept. 15, 1926

Witness
C. C. Holly

Inventor
Edward H. Amet
by James R. Townsend
his atty.

Patented June 7, 1927.

1,631,570

UNITED STATES PATENT OFFICE.

EDWARD H. AMET, OF REDONDO BEACH, CALIFORNIA.

MOTION-PICTURE-FILM FEED.

Application filed September 15, 1926. Serial No. 135,540.

An object of this invention is to provide an extremely simple, cheap and positive means for intermittently moving motion picture film in either camera or projecting machine, and positively moving it for maintaining perfect registry and for securing perfect division of the film into picture spaces.

An object is to provide means for positively stopping the film between each two movements.

An object is to provide for starting and stopping the film gradually and for speeding up the motion between the starting and stopping.

An object is to effect the intermittent motion with a continuous movement of the mechanism.

This invention is broadly new, basic and pioneer in that it comprises in combination with a film-way in which a film having equally spaced perforations may be moved lengthwise; a dog extending along one side of the film-way and provided with a detent to enter the perforations; separate shafts on the other side of the film-way; two crank pins on such shafts; a parallel motion connecting rod journalled on said crank pins; a tooth carried by said parallel motion connecting rod and adapted to move along the film-way and to move forward and backward through the film-way and through the film perforations respectively and to engage the dog and move the detent out of film engaging position at each revolution of the crank pins; the dog and its detent being arranged to be in film stopping position when the tooth is retracted, and the tooth being arranged to engage the dog to lift the detent from its film stopping position before the tooth engages the film to move it along the way.

Various features of invention are employed for the purpose of holding the dog in position and preventing it from displacement from working position; and the crankpins are mounted on disks, there being two pairs of crank disks, each pair being connected by a crank-pin so that the connecting rod carried by said pins may be between the disks, and provision is made for balancing the mechanism so that it will move smoothly.

A stop is also provided to prevent the tooth from throwing the dog too far; and said dog is resilient so that the action of the tooth thereon is without jar.

Other objects, advantages and features of invention may appear from the accompanying drawing, the subjoined detailed description and the appended claims.

The accompanying drawing illustrates the invention.

Figure 1:
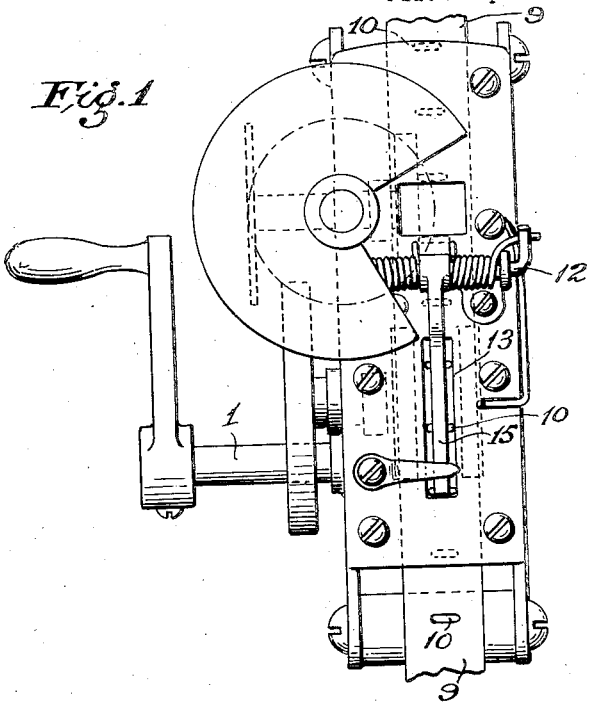
Figure 1 is a front view of a film feed apparatus embodying this invention with parts in film exposing position.
Figure 2:
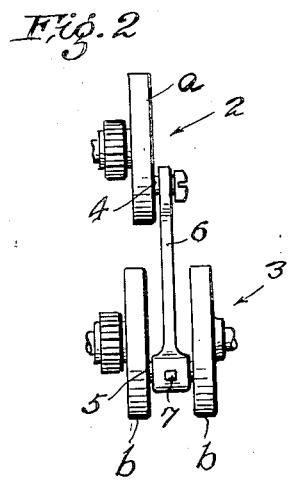
Fig. 2 is a fragmental front elevation of mechanism behind the film guide showing the parallel motion connecting rod and the crank mechanism for moving the same; the parts being in position for moving the film.
Figure 3:
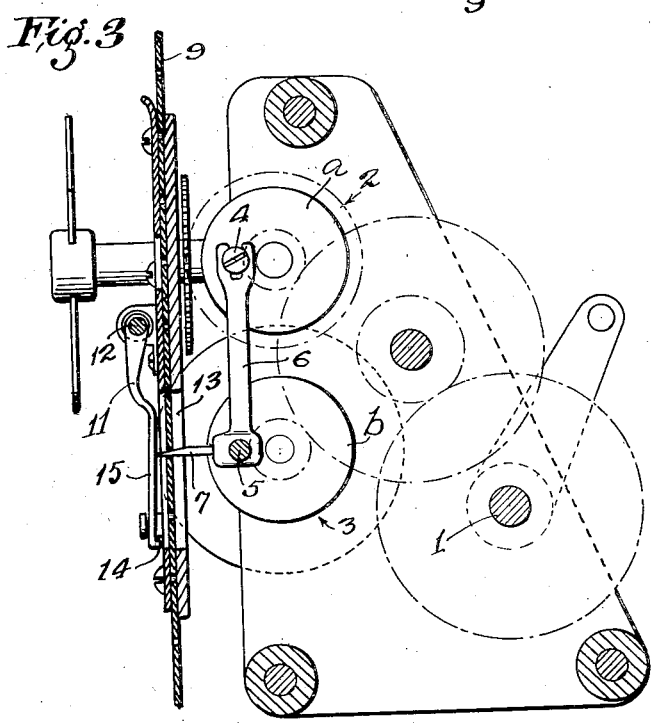
Fig. 3 is a fragmental side elevation of the invention with film in place and the parallel motion bar and its tooth in dog lifting and film moving position.
Figure 4:
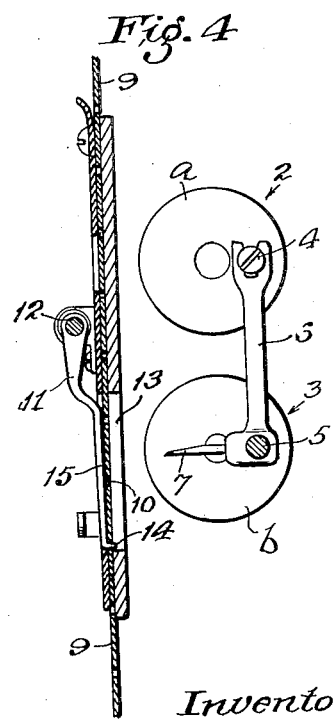
Fig. 4 is a fragmental side elevation showing the parts in film holding and exposing position.

The crank shaft 1 may be of any desired character and the cranks 2 and 3 are preferably formed of disks $a$, $b$, with crank pins as at 4 and 5 to which the connecting rod 6 is journalled at its opposite ends. 7 is the reciprocating tooth of said connecting rod; 8 is the film-way across which the tooth reciprocates and along which it travels to move the film in either direction.

9 indicates the film in such way provided with holes 10 through which the tooth 7 extends on its dog lifting and film operating movement.

11 is the film stop dog mounted on a spring operated shaft 12 which holds the stop dog in a slot 13 that opens to the filmway and from which the tooth lifts the dog when the tooth extends through the film. Said dog is provided with a detent 14 adapted to enter the hole 10 in the film which is brought into position to receive the detent at the moment before the tooth withdraws from one of the holes in the film. The dog has an elongate tooth contacting arm 15, along which the tooth moves in contact to hold the detent retracted from the film while the tooth is moving the film.

It is understood that various changes of proportions, lengths and sizes may be made and also the number of teeth or detents employed may be increased without changing the spirit of the invention.

I claim:—

1. A motion picture film feed comprising a film guideway, a dog having an elongate arm and having a detent to enter a hole in the film to hold the film stationary; a reciprocating tooth adapted to pass through a hole in the film to engage said arm to lift the detent from the film and to move the film longitudinally; and means for moving the tooth to and from the arm and along the film-way while in contact with the arm, and for withdrawing the tooth from the film and returning the tooth to initial position to again lift the dog and its detent and to move the film as before.

2. The combination with a film-way, of a dog on one side of the film-way provided with a detent to enter a hole in the motion picture film; two crank pins; means to simultaneously move the same; a parallel motion connecting rod connecting said crank pins and provided with a tooth adapted to contact with the dog and lift the detent from the film engaging position while the tooth is in contact with the dog and to retract the tooth from the film and return it to initial position when so retracted.

In testimony whereof, I have hereunto set my hand at Los Angeles, California, this 3rd day of September, 1926.

EDWARD H. AMET.